July 31, 1956
J. C. BOTTS ET AL
2,757,298
INSULATED COILS FOR ELECTRICAL MACHINES
AND PROCESSES FOR PREPARING THEM
Filed April 30, 1953
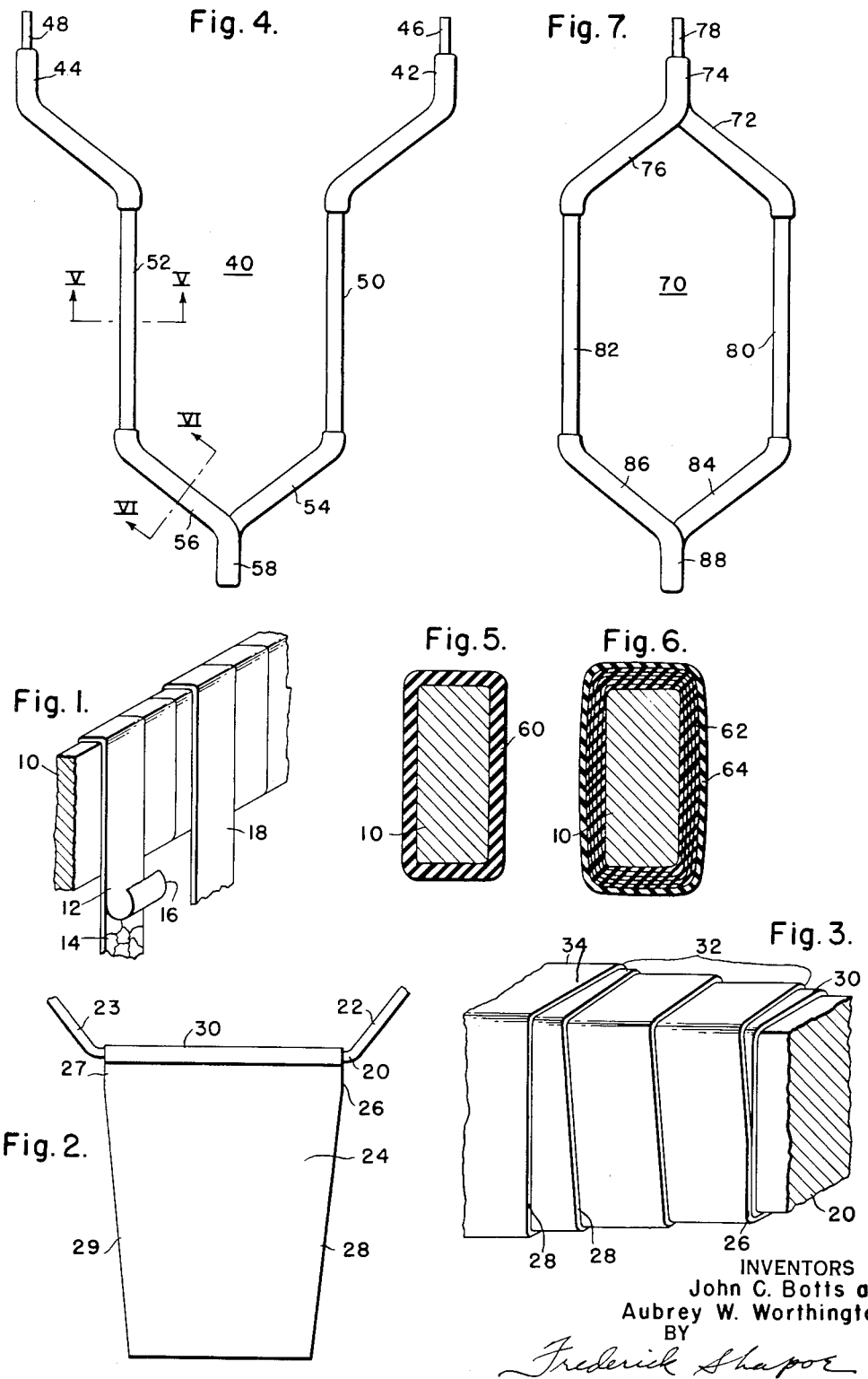
INVENTORS
John C. Botts and
Aubrey W. Worthington
BY
Frederick Shapoe
ATTORNEY

United States Patent Office 2,757,298
Patented July 31, 1956

2,757,298

INSULATED COILS FOR ELECTRICAL MACHINES AND PROCESSES FOR PREPARING THEM

John C. Botts, Pittsburgh, Pa., and Aubrey W. Worthington, Irving, Tex., assignors to Westinghouse Electric Corporation, East Pittsburgh, Pa., a corporation of Pennsylvania Application April 30, 1953, Serial No. 352,124

4 Claims. (Cl. 310—208)

This invention relates to insulated coils and windings for electrical machines and to processes for preparing such coils and windings.

In building electrical motors and generators in particular, insulated coils to be employed therein comprise slot portions and end portions. In order to produce the most efficient electrical machines of this type, it is desirable to employ the thinnest possible insulation on the slot portions so that the maximum amount of electrical conductor may be disposed in a given cross-sectional area of the rotor and and stator portions thereof. Since there usually is adequate space outside of the magnetic core portions of such machines, the end portions of windings need not be produced with as thin insulation, but it is necessary that the insulation on the end portions be adequate to withstand the electrical voltage applied thereto as well as the physical stresses, and wear and tear to which the end portions are subject in a greater degree than are the slot portions which are protected by the magnetic core.

The present invention is particularly directed to the making of full coils to be applied to electrical machines. In such full coils there are two slot portions disposed at an angle to each other and connected by end or diamond portions so that the slot portions will fit into radial slots in the magnetic core of the rotor or stator of the electrical machine. In the process of fitting the slot portions of the full coils into these radial slots, the coils must be flexed and bent substantially at the end or diamond portions. If the insulation applied to the end portions comprises mica impregnated with a hard, fully cured resin, this flexing and bending will crack and seriously damage the insulation.

The object of the present invention is to provide coils for electrical machines having slot portions insulated with mica and fully cured completely reactive resins, whereby a solid void-free insulation is present on such slot portions, and having end portions insulated with mica and uncured completely reactive resin, whereby the coils may be fitted into electrical machines by flexing and bending at the end portions without causing damage thereto.

A further object of the invention is to provide a process for preparing coils from mica insulation and completely reactive resinous compositions so that the slot portion only of such coils is cured and shaped to size, while at the end portions the resinous composition is uncured in order to enable building of electrical machines therefrom.

Other objects of the invention will, in part, be obvious and will, in part, appear hereinafter. For a better understanding of the nature and objects of the invention, reference should be had to the following detailed description of the drawing, in which:

Figure 1 is a fragmentary view in perspective illustrating one mode of building of a full coil in accordance with the present invention;

Fig. 2 is a partial view illustrating a modification of the process of wrapping a full coil in accordance with the invention;

Fig. 3 is an enlarged perspective view of a portion of a coil prepared as illustrated in Fig. 2;

Fig. 4 is a plan view of a U-shaped full coil having two slot portions and end windings;

Fig. 5 is an enlarged cross section along line V—V of Fig. 3;

Fig. 6 is an enlarged cross section along line VI—VI of Fig. 3; and

Fig. 7 is a plan view of a closed full coil having two slot portions.

We have discovered novel processes for building full coils for electrical machines in which the insulation comprises mica and completely reactive resinous compositions. Briefly, in our process (1) one or more electrical conductors are shaped to the desired full-coil form, (2) sheet mica insulation, prepared as disclosed hereinafter, is wrapped on at least the slot portions of the coil, (3) the mica wrapped coil is impregnated with a liquid completely reactive resinous composition, (4) the coil is then covered with an impervious sheet or tape material which serves to retain the impregnated liquid completely reactive composition within the mica insulation, (5) the slot portions only of the full coil are cured under heat and pressure, leaving the end portions with uncured resinous compositions, (6) if the end portions have not been previously wrapped with mica, they are now wrapped with sheet mica insulation impregnated with the liquid resinous composition and covered with the impervious sheet material, (7) then the coil is fitted into the electrical machine, and (8) finally the machine with the full coils properly disposed therein is heated to complete the cure of all of the resinous composition present therein. In all cases, the full coil, before being placed in the electrical machine, comprises end portions in which the resinous composition is in the uncured liquid state and, therefore, the end portions can be flexed, bent and otherwise distorted considerably to enable the placing of the slot portions of the full coil in the slots of the machine. The lacing or other operations necessary to bind the end turns together may be carried out readily. The end portions will withstand such operations without damage because of the fact that the resinous composition thereon is liquid. When the stator or rotor of the electrical machine has been built by assembling all of the coils therein, it can be heated to polymerize completely all of the liquid resinous composition in the coils.

The mica tape for building coils in accordance with the present invention is prepared from a sheet backing material upon which is disposed a layer of mica flakes and the sheet backing and the mica flakes are treated with a liquid resinous binder having a viscosity of between 25 and 10,000 poises at 25° C. The mica flakes are then preferably covered with another layer of sheet backing in order to protect the layer of mica flakes and to produce a more uniform insulation. This mica insulation is preferably in the form of a tape of the order of one inch in width though tapes or sheet insulation of any other width may be prepared. Application Serial No. 161,231, assigned to the assignee of the present invention, describes in detail the preparation of such composite mica insulation, and reference may be had to that application for details as to the compositions and the methods or preparation of such tapes.

For building electrical machines, the sheet backing for the tape may comprise paper, cotton fabrics, asbestos paper, glass cloth or glass mat, or sheets or fabrics prepared from synthetic resins such as nylon, polyethylene and linear polymethylene terephthalate resins. We have successfully employed sheet backing material of a thickness of approximately 1 mil to which there has been applied a layer of from 3 to 10 mils thickness of mica flakes. The liquid binders for the mica flakes are preferably linear polyesters that are liquids of the viscosity indicated herein; such polyesters are soluble in and compatible with, unsaturated polyester resinous compositions that will be employed in subsequently impregnating the coils insulated with such tapes. Liquid binders comprising poly-alphamethyl styrenes of a molecular weight of 3,000 have been used in making satisfactory mica tape for the purpose of this invention. Reference should be had to application Serial No. 161,231 for further details with respect to suitable resinous binders for the mica tapes. In any event, the liquid resinous binder for the mica tape should be from 3% to 25% by weight of the complete tape and preferably from 3% to 8% by weight for optimum strength. We have found that tapes so prepared are extremely flexible and possess considerable strength so that they may be wrapped quite firmly and tightly about conductors. While the resinous binder is a liquid, when used in the amounts indicated, the tapes do not appear wet, nor is there any appreciable exudation or bleeding of the liquid binder from the tapes.

The full coils with which the present invention is concerned may comprise a single wire or strap of copper, aluminum, or other conductor material, or they may comprise a plurality of turns or layers of such conductor material. It may be desirable with multi-turn coils to employ turn insulation between the turns in accordance with well-known practice. Such turn insulation may comprise a wrapping of glass fibers and a resinous impregnant. In any case, the conductor is formed to the desired coil shape and presents at least two slot portions with end portions attached to and connecting such slot portions. In the case of a closed full coil, the end portions will include leads comprising uninsulated portions of the conductor. In the case of open full coils of U-shape, one end or diamond portion will connect the two slot portions while the other end portion will consist of separate tangents, each of which ends in uncovered leads for connecting to other coils or to commutator segments.

In order to prepare coils having slot portions insulated with layers of mica flakes impregnated with fully cured resinous composition and end portions insulated with layers of mica flakes containing only uncured fully reactive liquid resinous composition, two procedures may be followed. The preferred procedure of these two, comprises initially wrapping only the slot portions of the full coils with several layers of the mica tape or mica sheet with the liquid binder. The mica wrapping is so applied that it is tapered at both ends of each slot portion.

This procedure is illustrated in Figs. 1, 2 and 3 of the drawing. In Fig. 1, the slot portion of conductor 10, shown as a single strap of copper for instance, but which may comprise a plurality of turns of separate conductors, is first wrapped with an overlapping layer of tape 12. The tape 12 comprises mica flakes 14 and a sheet backing 16 all united with a liquid resinous binder. One or more additional layers 18 of mica tape may be applied. The layers of tape are tapered at each end of the slot portion such as shown in Fig. 3.

In Fig. 2 is shown a fragment of a full coil being insulated, which coil comprises a slot portion 20 with end portions 22 and 23 extending therefrom. Sheet mica wrapper 24, fabricated from a sheet backing, mica flakes and a liquid resinous binder similar to the tape 12, comprises a first portion of a width from sides 26 to 27 equal to substantially the full length of the slot portion 20, and tapered side portions 28 to 29.

After the entire mica wrapper has been fully wrapped on the slot portion 20, it produces several initial layers 30 of mica insulation over substantially the entire length of the slot portion and subsequent shorter layers. This results in tapered ends as illustrated in the enlarged view of Fig. 3. As evident from this figure, the initial layers 30 extend to the side 26, and the tapered side portion 28 results in a tapered end 32 which terminates in the final layer 34. The tapered portion 32 may have a length of at least about one-half inch up to several inches, depending on the size of the coil and length of the slot portion 20. Both slot portions of the full coil are similarly wrapped.

The coil with only the slot portions provided with layers of mica insulation is then vacuum impregnated with a liquid completely reactive resinous composition, such composition being more fully detailed hereinafter. The coils are briefly drained after being withdrawn from the vacuum impregnating apparatus, and then the impregnated slot portion is wrapped with an impervious sheet material to prevent escape or loss of the liquid resinous composition. Impervious films or sheets, of a thickness of about a mil or more, of polyvinyl alcohol, polytetrafluoroethylene or polymethylene terephthalate esters are suitable. The wrapped impregnated slot portions are then hot pressed to reduce the applied mica insulation to desired size and shape and to cure the completely reactive composition. The hot pressing may be carried out in a heated mold or else the slot portion can be clamped in a confining form and placed in an oven or autoclave until cured. The cured coil is taken out of the press or metal form and the impervious sheet stripped. This will expose the full coil with shaped, full cured mica insulation on the slot portions only. The resinous impregnant will have been cured to a thermoset state.

Glass fiber tape or other abrasion resisting tape may be applied over the cured slot portions—up to the tapered ends 32—to enable the coils to be placed in slots of electrical machines without damage to the mica insulation.

The end portions of the full coil with the fully insulated slot portions are then wrapped with layers of mica tape similar to that previously applied to the slot portions. These further applications of mica tape are carefully applied to butt against the side portions 28 of the layers of mica tape in the tapered portion 32 to provide a relatively smooth progression. After the end portions of the full coils are fully taped, they are then impregnated with the completely reactive liquid resinous composition, drained and the mica tape on the end portions is wrapped with the impervious sheet material to prevent loss of the impregnated resinous composition. However, the resinous composition is not cured until after the full coils have been placed in an electrical machine. The mica tape on the end portions with the applied liquid resinous composition can be flexed and bent considerably without any undesirable results.

Since the slot portions of the full coils have been molded and cured while the end portions have not been compacted or cured, the end portions will be bulkier and of larger size than the slot portions. The appearance of these full coils will be as shown in Fig. 4 for a U-shaped, open full coil, or as in Fig. 7 for a closed full coil.

In insulating full coils in accordance with the second procedure of this invention, the shaped coil conductors are completely wrapped with the composite mica tape or wrapper, except for the leads thereof. Ordinarily the mica tape will be half lapped, the thickness and number of layers of the mica tape being governed by the voltage and other requirements of the machine being built. Thereafter, the fully taped coils are vacuum impregnated with a completely reactive resinous composition. The vacuum impregnation enables moisture, air and volatile material present in the insulation to be withdrawn and then the coil is immersed in a liquid completely reactive resinous composition. During impregnation, positive pressure may be applied to the resinous composition to force it into all the interstices and spaces in the mica insulation present on the coils. If five or more layers of mica tape are employed, the vacuum impregnation process is preferably followed by application of a substantial positive pressure of from 20 to 100 p. s. i. in order to force the resinous composition more thoroughly into the interstices and spaces within the mica insulation. The coil is then withdrawn from the impregnating tank and permitted to drain slightly. The coil is then immediately wrapped with at least one layer of an impervious resinous sheet material to prevent loss of resinous composition from the coil. A suitable impervious wrapping material is polymethylene terephthalate. The preparation of polymethylene terephthalate polymers is set forth in Whinfield et al. U. S. Patent 2,465,319. We have secured excellent results by wrapping coils with one inch wide tapes of such impervious material, the tape being half lapped. The tapes have sufficient elasticity to permit a fairly tight wrapping to be accomplished and very little of the liquid resinous material exudes or escapes.

The impregnated coils are then processed by heating the slot portions only in a hot press in order to shape the insulation at the slot portions into the most compact form and to cure the applied resinous composition. The temperature employed in the press and the time of heating are such that the resinous composition applied beyond the slot portion is not cured for any substantial distance therefrom. This hot pressing operation produces a coil having a slot portion of the exact size required for the electrical machine and it can be fitted into the slots of the electrical machine readily with only moderate flexing of the end portions.

If desired, the slot portions can be wrapped with a layer of glass fiber tape or other tape to impart greater strength and abrasion resistance.

Completely reactive compositions suitable for use in the process may include any fluid, completely polymerizable composition, miscible with and compatible with the resinous binder in the mica tape, that, upon being heated to a predetermined temperature, ordinarily embodying a catalyst, polymerizes into a thermoset, relatively-hard resinous body. The fluid resinous composition may comprise a single polymerizable component such, for example, as diallyl phthalate, diallyl succinate, diallyl maleate, diallyl adipate, methallyl acrylate, diallyl ether, allyl acrylate, and allyl crotonate. It will be noted that such compositions comprise at least two unsaturated $>C=C<$ groups capable of vinyl-type addition polymerization. Good results have been secured with monomers containing two or more of these unsaturated groups capable of polymerization upon being subjected to a polymerization catalyst and heat. It will be understood that mixtures of any two or more polymerizable monomers, such mixtures being thermosettable, for example, 95% monostyrene and 5% divinyl benzene, may be employed.

Numerous other completely reactive multicomponent polymerizable compositions are known to the art. Such compositions include, in many cases, an unsaturated resinous component—particularly an unsaturated polyester resin—and an unsaturated polymerizable liquid monomer. Particularly good results have been secured by employing as the polyester resin the reaction product of an ethylenic dicarboxylic acid or anhydride thereof such, for example, as maleic acid, fumaric acid, maleic anhydride, monochloromaleic acid, itaconic acid, itaconic anhydride, citraconic acid and citraconic anhydride. The unsaturated dicarboxylic acid or anhydride or mixtures thereof are reacted with a substantially molar equivalent of a polyhydric alcohol such as ethylene glycol, glycerol, propylene glycol, diethylene glycol, or pentaerythritol or mixtures thereof. Castor oil has been employed successfully in reactions with maleic anhydride, and the resultant castor oil maleate ester admixed with a polymerizable unsaturated monomer, for example, monostyrene, in the proportions of from 10 to 95 parts by weight of the ester. In the preparation of the unsaturated alkyd esters, an ethylenically unsaturated alpha-beta dicarboxylic acid or anhydride may be replaced with up to 95% of the weight thereof by a saturated aliphatic dicarboxylic acid or aryl dicarboxylic acid or anhydride, such, for example, as succinic acid, adipic acid, sebacic acid, phthalic acid, phthalic anhydride, or the like. Also, mixtures of polyhydric alcohols may be employed. In some instances, epoxides have been employed in lieu of glycols, particularly in reactions with dicarboxylic acids instead of their anhydrides.

The resulting alkyd esters may be dissolved in a liquid unsaturated monomer having the group $>C=C<$. Suitable liquid unsaturated polymerizable monomers are: Monostyrene, alphamethylstyrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol, acrylonitrile, methyl vinyl ketone, diallyl ether, vinylidene chloride, butyl methacrylate, allyl acrylate, allyl crotonate, 1,3-chloroprene, and divinyl benzene, as well as mixtures of two or more of any of these monomers.

An excellent completely reactive composition is one composed of a solution in from 90 to 50 parts of arylalkene polymerizable monomer of from 10 to 50 parts by weight of the alkyd reaction products of (A) an unsaturated acidic compound from the group consisting of maleic acid, maleic anhydride, fumaric acid, citraconic acid and citraconic anhydride in admixture with one or more saturated straight chain dicarboxylic acids having the carboxyl groups disposed at the end of the straight chain, the chain having from 2 to 10 noncarboxyl carbon atoms and no other reactive groups, and (B) a molar equivalent, within ±10%, of an aliphatic saturated glycol having no other reactive group than the hydroxyl groups. The proportion of the unsaturated acidic compound in the mixture of acids should be between 5% and 50% of the weight of the mixture. Suitable saturated dicarboxylic acids are adipic acid, sebacic acid, azelaic acid, suberic acid, succinic acid, decamethylene dicarboxylic acid and diglycolic acid and mixtures thereof. With the longer chain saturated dicarboxylic acids, as, for example, sebacic acid, the proportion of maleic anhydride, for example, may be higher than if the saturated acid were all succinic acid, if cured products of similar degrees of hardness are desired. Suitable glycols for reaction with the mixture of saturated and unsaturated acids are ethylene glycol, propylene glycol, diethylene glycol, 1,5-pentanediol and triethylene glycol. Mixtures of the glycols are suitable for producing the reaction product. The reaction of the (A) acidic compounds and (B) the glycols may be carried out by heating in a reaction vessel at temperatures of from 100° C. to 250° C. for from 24 hours to 2 hours to a low acid number of below 60.

The following are specific examples of the preparation of the unsaturated alkyd reaction products to be dissolved in the vinyl aryl monomer.

*Example I*

A mixture of 44 mole percent of adipic acid and 6 mole percent of fumaric acid was combined with 50 mole percent of propylene glycol and reacted, with $CO_2$ sparging, for about 4 hours at 140° C. in a closed reaction vessel, after which the temperature was raised to 220° C. over a 4-hour period and the reaction was continued at 220° C. for 8 hours. A syrupy polyester resin was produced.

Another composition comprised the reaction product of 10 mole percent of maleic anhydride, 40 mole percent of adipic acid, and 50 mole percent of diethylene glycol.

*Example II*

A reaction product was prepared by reacting 30 mole percent of sebacic acid, 20 mole percent of maleic anhydride, and 50 mole percent of diethylene glycol under the same conditions as in Example I with a syrupy resin of low acid number resulting.

The unsaturated esters or alkyd resins of Examples I and II are dissolved in a monomeric compound having the reactive group $>C=C<$ such as monostyrene or a simple substitution derivative of monostyrene, or a mixture of two or more monomers, as above described, to produce low viscosity, completely reactive solutions having present from 10% to 50% by weight of the unsaturated ester. Particularly good results have been obtained by dissolving the unsaturated esters in the monostyrene to produce solutions containing from 50% to 85% by weight of monostyrene and the balance, 50% to 15% by weight, composed of the unsaturated esters.

The above fluid resinous compositions will polymerize completely upon heating in the presence of one or more vinyl-type polymerization catalysts, such as benzoyl peroxide, lauroyl peroxide, methyl ethyl ketone peroxide, t-butyl hydroperoxide, ascaridole, tert-butyl perbenzoate, di-t-butyl diperphthalate, oxonides, and similar catalysts, in an amount of from 0.1% to 2% and more, by weight. Polymerization accelerators such as cobalt naphthenate and other driers may be employed. The proportion of the catalyst obviously may be present in amounts differing from these percentages.

Coils produced by the impregnation of the mica wrapping in any of these completely reactive compositions are placed in a hot press in which the slot portions only are subjected to heat and pressure for a period of time of from about one hour at 100° C. to from 3 to 5 minutes at 135° C. to 150° C. which conditions are adequate to cure the resinous composition in the slot portions. The end portions of the windings will be substantially uncured.

Referring to Fig. 4 of the drawings, there is illustrated an open U-shaped full coil 40 comprising diverging end portions 42 and 44 terminating in bare leads 46 and 48, respectively. The end portion 42 extends from one slot portion 50 of the coil while the end portion 44 extends from another slot portion 52. The slot portions 50 and 52 have been hot pressed to predetermined size and shape and the resinous composition therein has been fully cured. The coil comprises end portions 54 and 56 connected by a looped portion 58.

It will be apparent that the slot portions 50 and 52 are substantially thinner than the end portions. Further, the slot portions have been reduced to predetermined cross sectional shape and size. This is evident by comparing the cross sections at V—V shown in Fig. 5 and VI—VI shown in Fig. 6, these being made, respectively, at the slot portion and at the end winding portion of the coil of Fig. 4. As shown in Fig. 5, at the slot portion, the conductor 10 is tightly enclosed in the insulation 60 comprising the mica insulation impregnated with fully cured resinous composition. The wall thickness of the insulation 60 is uniform.

By contrast, as illustrated in Fig. 6 in slightly exaggerated form, the conductor 10 is insulated with mica tape insulation 62 saturated with the uncured liquid resinous composition. The impervious sheet wrapping 64 is also present on the end portion. The insulation in Fig. 6 exhibits a barreled appearance. However, at the end windings the space factor and shape are not critical as is the space factor and shape in the slot portions which must fit closely into the magnetic core of the electrical machine.

A closed full coil 70 prepared in accordance with the present invention is illustrated in Fig. 7. The full coil comprises an end portion comprising a tangent 72, a connecting loop 74 and another tangent 76 with bare leads 78 extending therefrom. Slot portions 70 and 82 of the coil which have been hot pressed to cure the resin and to form them to predetermined shape and size, are connected to the tangents 72 and 76, respectively. These slot portions are connected to other tangents 84 and 86 connected through another loop 88. It will be noted that the insulation at portions 72, 74, 76, 84, 86 and 88 is heavier and not as compact as is the insulation at the slot portions 80 and 82.

The complete full coils prepared as disclosed herein, with cured slot portions and uncured end portions are placed within the slots of the stator or rotor of an electrical machine and the end windings wrapped and tied together. The uninsulated leads are then soldered, welded or otherwise connected to each other or to the commutator. Thereafter, the entire machine will be placed in an oven and heated to a temperature to cure the completely reactive composition applied to the end portions. An outer fibrous tape will protect the impervious sheet and the insulation in the process of disposing the slot portions of the coil within the magnetic core of the electrical machine so that the insulation will not be damaged.

In both coils shown in Figs. 4 and 7, the end portions comprise mica tape containing the liquid polymerizable resin impregnant at the time that the coils are being disposed within the slots of the electrical machine, while the slot portions are substantially completely cured and shaped. However, after the coils have been placed in an electrical machine, and laced or tied and otherwise not subjected to any further twisting or bending, the compositions in the end portions are cured by subjecting them to suitable baking or heating. The heating may be accomplished by placing the entire electrical machine in an oven or by passing an electrical current through the windings sufficient to cause them to heat up at a temperature adequate to polymerize the impregnated compositions. Infrared heating lamps may be employed alone or in combination with such other heating means.

The following examples illustrate the practice of the invention.

*Example III*

Copper strap was formed into a full coil having two slot portions and end portions somewhat similar to the coil shown in Fig. 4 of the drawing. Three layers of 5.5 mil thick mica tape were half-lapped over the entire length of the coil except for small portions at the ends to serve as leads. The mica tape comprised approximately two mils of paper and 3½ mils of mica flakes. The coil with the applied mica tape was then treated with resinous composition corresponding to that of Example I, then 0.0007 inch thick polymethylene glycol terephthalate film was wrapped thereon followed by a layer of butted glass tape of a thickness of 0.007 inch. The coil with the insulation was cured by heating the slot portions only in a press for 1 hour at 100° C. The resin in the end portions was liquid and uncured. Tests of the fully cured coil indicated that the insulation would hold an average of 19.3 kilovolts.

Electrical tests of impregnated mica insulation prepared in accordance with this invention indicated the superiority of the insulation of the coils when installed in electrical machines. For these tests the slot portions only of the coils were cured as disclosed herein previous to inserting the coils in a motor. Thereafter, the wound motor was baked in an oven for 15 hours at 135° C. to cure the resins in the end portions. On electrical tests the fully cured coils held an average of 400 volts per mil of insulation. The motors so produced were then sprayed with water at the rate of 6⅔ gallons per minute, using tap water. The water spray was applied to cover the entire winding. In the course of this treatment, well over 100,000 gallons of water was applied to the motor. At the end of 700 hours, the insulation resistance which had initially been 180,000 megohms had decreased to 18 megohms and when subjected to drying by blowing air at room temperature across the coils, the insulation resistance increased rapidly so that at the end of 400 hours, it had reached a resistance of 1000 megohms and at the end of 700 hours had regained a value of 2500 megohms. Coils prepared in accordance with the best previous practices, when subjected to a similar test, decreased rapidly from an initial resistance of 32,000 megohms to less than 0.03 megohm at the end of 700 hours of water spraying, and, when dried at room temperature, the resistance at the end of 300 hours was less than 0.55 megohm and at 700 hours drying reached a value of 31 megohms. In general, we have found the insulation resistance of the coil insulation of the present invention is roughly 650 times higher under severe humidification and wetting conditions than is the insulation resistance of coils prepared in accordance with the best accepted previous practice.

In some cases, the vacuum impregnation of the liquid polymerizable compositions need not be carried out. We have obtained substantial insulation by brushing the completely reactive compositions upon each layer of mica tape applied to the conductor. Upon wrapping the conductor with impervious tape and applying pressure at the slot portion, the completely reactive composition penetrates and fills the interstices and spaces in the insulation. Insulation so prepared has a dielectric strength of 340 to 385 volts per mil of insulation. For certain types of motors and generators dielectric strengths of this order are acceptable.

It should be understood that the above description and drawing are exemplary and not limiting.

We claim as our invention:

1. In the process of insulating a full coil having two slot portions and a connecting end portion, for use in an electrical machine, the steps comprising wrapping at least the two slot portions with sheet insulating material, the sheet insulating material comprising a sheet backing, mica flakes disposed on the backing and a liquid resinous binder having a viscosity of from 25 to 10,000 poises at 25° C. uniting the mica flakes and sheet backing into a strong, pliable sheet, vacuum impregnating the wrapped coil with a liquid completely reactive resinous composition comprising a monomeric compound having at least two >C=C< groups, the liquid resinous binder being miscible and compatible with the reactive resinous composition whereby the liquid reactive resinous composition readily penetrates through the applied wrapped sheet insulating material and fills the spaces and interstices thereof, wrapping the vacuum impregnated coil with a tape impervious to the liquid reactive composition, applying heat and pressure to only the slot portions of the windings to cure the applied polymerizable composition only at the slot portions and to shape the insulating material at such slot portion to desired size and form, wrapping the end portion of the coil with the mica sheet insulating material, impregnating the wrapped end portion with the liquid completely reactive resinous composition, wrapping the impregnated end portion with the tape impervious to the composition to prevent its escape from the end portion, placing the full coil into an electrical machine, the end portion being flexible so that the coil can be flexed and bent at said end portions while the slot portions are being put into the slots of the machine, the liquid composition in the end portion enabling such flexing without damage to the mica insulation, and thereafter curing the liquid reactive composition in the end portion of the coil to a thermoset state.

2. In the process of insulating a full coil having two slot portions and a connecting end portion, the steps comprising wrapping a plurality of layers of sheet insulating material on the slot portions only of the coil, the applied layers of sheet insulating material having ends tapering down to the coil conductor, the sheet insulating material comprising a sheet backing, a layer of mica flakes disposed on the backing and a liquid resinous binder having a viscosity of from 25 to 10,000 poises at 25° C. uniting the mica flakes and backing into a strong, pliable sheet, vacuum impregnating the coil with a liquid completely reactive resinous composition having at least two >C=C< groups, the liquid resinous binder being miscible and compatible with the liquid reactive resinous composition whereby the liquid reactive resinous composition readily penetrates through the applied wrapped sheet insulating material and fills the spaces and interstices thereof, wrapping the vacuum impregnated coil with an impervious sheet material to retain the liquid reactive resinous composition in the coil, pressing the slot portions of the coil to predetermined size and shape, heating the coil while pressed to cure the completely reactive resinous composition, thereafter wrapping the end portions of the coil with the sheet insulating material, the wrapping being applied to overlap the tapered ends on the slot portions and to provide a uniform prolongation thereof, again vacuum impregnating the coil with the liquid completely reactive composition, wrapping the coil with the impervious sheet material, inserting the coil into an electrical machine, the end portions being sufficiently flexible to enable the slot portions to be inserted into the slots of the machine without substantial damage, and thereafter heating the coils while in the electrical machine to cure the completely reactive resinous composition on the end portions.

3. In the process of insulating full coils comprising two slot portions and a connecting end portion, for use in an electrical machine, the steps comprising wrapping the slot portions and an end winding portion of the coil with sheet insulating material, the sheet insulating material comprising a sheet backing, mica flakes disposed on the backing and a liquid resinous binder having a viscosity of from 25 to 10,000 poises at 25° C. uniting the mica flakes and sheet backing into a strong, pliable sheet, vacuum impregnating the wrapped coil with a liquid completely reactive resinous composition comprising a monomeric compound having at least two >C=C< groups, the liquid resinous binder being miscible and compatible with the liquid reactive resinous composition whereby the liquid reactive resinous composition readily penetrates through the applied wrapped sheet insulating material and fills the spaces and interstices thereof, wrapping the exterior of the vacuum impregnated coil with an impervious sheet material to retain the liquid reactive composition within the just applied wrapping, pressing the slot portions of the coil to shape the applied impregnated wrapping to desired shape and size, and heating the slot portion while so pressed to cure only the resinous composition present at the slot portions, the end portions being uncured, introducing the coil into an electrical machine, the end portions being flexible and pliable, without substantial damage, and curing the impregnated liquid polymerizable composition in the end portions by heating the coils after they have been introduced into the electrical machine.

4. A full electrical coil comprising two slot portions and a connecting end portion, insulation applied to both the end portions and the slot portions, the insulation comprising layers of mica tape and a completely reactive liquid thermosettable resin applied to the mica tape, the insulation at the slot portions being compressed to size and shape and the resin at the slot portions only being fully cured to a thermoset condition, an exterior wrapping of impervious film material applied over the layers of mica tape and applied completely reactive liquid thermosettable resin on the end portions, the resin in the end portions being liquid and uncured, the ends of the layers of mica tape and cured resin at the slot portions being tapered and the insulation applied to the end portions overlaps the tapered portions to provide a relatively smooth progression, whereby the full coil can be flexed at the end portions during handling and inserting of the slot portions into slots in an electrical machine without damaging the insulation, the liquid resin in the end portion being thermosettable thereafter.

References Cited in the file of this patent

UNITED STATES PATENTS

| | | |
|---|---|---|
| 1,697,134 | Neely | Jan. 1, 1929 |
| 2,425,294 | Morgan | Aug. 12, 1947 |
| 2,462,977 | Kitchin et al. | Mar. 1, 1949 |
| 2,656,290 | Berberich et al. | Oct. 20, 1953 |